W. R. LOHSE.
GRIPPING ATTACHMENT FOR AUTOMOBILE WHEELS.
APPLICATION FILED NOV. 27, 1916.
1,261,415. Patented Apr. 2, 1918.
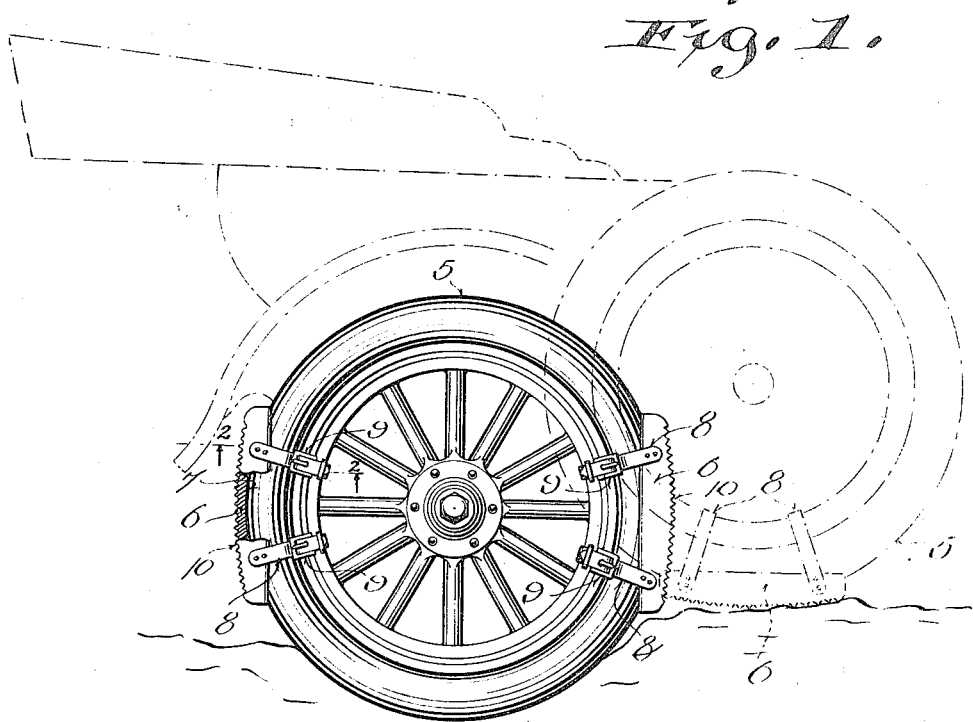
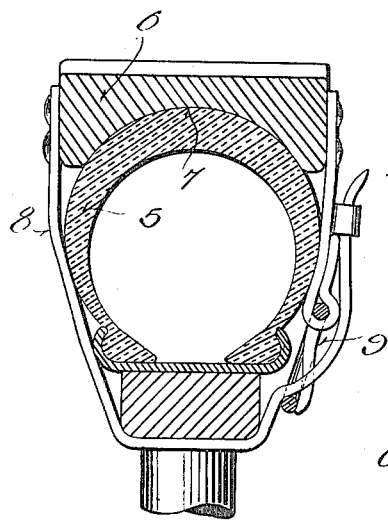

UNITED STATES PATENT OFFICE.

WILHELM R. LOHSE, OF MILWAUKEE, WISCONSIN, ASSIGNOR, BY DIRECT AND MESNE ASSIGNMENTS, OF ONE-THIRD TO JOHN BUCHHOLZ, OF CUDAHY, WISCONSIN, AND ONE-THIRD TO GEORGE MAYER, OF MILWAUKEE, WISCONSIN.

GRIPPING ATTACHMENT FOR AUTOMOBILE-WHEELS.

1,261,415.  Specification of Letters Patent.  Patented Apr. 2, 1918.

Application filed November 27, 1916. Serial No. 133,663.

*To all whom it may concern:*

Be it known that I, WILHELM R. LOHSE, a subject of the Emperor of Germany, but having declared my intention to become a citizen of the United States, and resident of Milwaukee, in the county of Milwaukee and State of Wisconsin, have invented certain new and useful Improvements in Gripping Attachments for Automobile Wheels; and I do hereby declare that the following is a full, clear, and exact description thereof.

The present invention relates to new and useful improvements in attachments for the wheels of self propelled vehicles, to increase the tractive power of said wheels.

In traveling over rough and muddy roads the wheels of an automobile often become mired in a mud hole or other depression, and continued rotation of the wheels serves only to sink them farther even when such wheels are equipped with chains or similar gripping devices.

It is primarily the object of the present invention to provide a device which may be attached to the drive wheels of a self propelled vehicle, whereby upon driving rotation of the wheels they may be propelled from the depression, it being more specifically an object to provide an attachment of this nature which may be most readily applied and detached.

A further object resides in the provision of such a device which is of an exceedingly simple structure.

With the above and other objects and advantages in view the invention resides more particularly in the novel combination, formation and arrangement of parts hereinafter described and pointed out in the appended claim.

In the drawings:

Figure 1 is a side elevational view of an automobile having a pair of my improved ground gripping devices associated therewith.

Fig. 2 is a transverse sectional view through the tire of the wheel and one of the gripping devices as indicated by the line 2—2 of Fig. 1, the securing strap being shown in elevation.

Referring now more particularly to the accompanying drawings, 5 designates an automobile wheel having a pair of my gripping devices associated therewith, each of which comprises an elongated fiber block 6 having its inner face provided with a channel 7 conforming to and adapted to fit against the tread portion of the wheel, and each block is secured thereto by straps 8 provided with buckles 9 whereby they may be tightly fastened about the tire. The outer face of each block 6 is curved in an arch, the diameter of which is substantially greater than the diameter of the inner channel 7 to thus form an eccentric shoe relative to the wheel tread whereby the thickened end portions of the block constitute initial lifting projections on the periphery of the wheel as hereinafter described. Thus referring to Fig. 1, as the wheel is rotated in its normal drive movement the lowermost end of the block at the forward side of the wheel will be urged into the side of the depression in which the wheel is disposed to exert a positive gripping action on the ground, preventing a slippage of the block farther into the depression and continued rotation of the wheel will rock the wheel forwardly of said end as a pivot, so that the wheel will rise and move forwardly out of the depression.

As rotative movement of the wheel continues, the other end of the block will then engage the ground and form a second projection on the wheel and will grip the ground in such manner as to positively prevent slippage of the wheel back into the depression, the position of the wheel when the block leaves the ground being sufficiently forward of the depression to insure advancing movement of the wheel. In a road wherein depressions are comparatively isolated, one of my devices may be applied and removed from the wheels upon successive miring engagements of the wheels in such depressions. Should the road, however, be marshy or otherwise continuously liable to miringly engage the wheel, a pair of my gripping devices may be attached to the wheel during the entire passage of the automobile through such bad portions of the road.

In contradistinction to gripping devices such as chains, my gripping device affords a positive gripping projection on the tread surface of the wheel, and it is the engagement of this projection in the depression which procures an exceedingly great gripping action that lends my device a peculiar value in propelling the wheels out of mud holes and the like.

While I have shown and described a preferred form of my invention it is obvious that to adapt the device for use in connection with differing types of wheels and differing ground conditions, various modifications of structure may be resorted to without departing in any manner from the spirit of the invention as interpreted by the appended claim.

What is claimed:

A gripping device for wheels comprising an elongated fiber block having its inner face longitudinally channeled to nest upon the curved tread portion of a wheel and its outer face curved in an arch the diameter of which is substantially greater than the diameter of the inner channel to thus form an eccentric shoe relative to the wheel tread whereby the thickened end portions of said block constitute initial lifting projections on the periphery of the wheel, and means for retaining said block upon the wheel substantially as described.

In testimony that I claim the foregoing I have hereunto set my hand at Milwaukee, in the county of Milwaukee and State of Wisconsin.

WILHELM R. LOHSE.